(12) United States Patent
Choi et al.

(10) Patent No.: US 7,112,255 B2
(45) Date of Patent: Sep. 26, 2006

(54) THERMOBONDABLE FILTER MEDIUM AND BORDER FRAME AND METHOD OF MAKING SAME

(75) Inventors: Kyung-Ju Choi, County of Jefferson, KY (US); Dennis R. Porter, County of Dallas, TX (US); Paul B. Ryan, County of Dallas, TX (US)

(73) Assignee: AAF-McQuay Inc., Louisville, KY (US)

( * ) Notice: Subject to any disclaimer, the term of this patent is extended or adjusted under 35 U.S.C. 154(b) by 386 days.

(21) Appl. No.: 10/728,643

(22) Filed: Dec. 5, 2003

(65) Prior Publication Data

US 2004/0112526 A1    Jun. 17, 2004

Related U.S. Application Data

(62) Division of application No. 10/119,997, filed on Apr. 10, 2002, now Pat. No. 6,758,878.

(51) Int. Cl.
*B29C 65/00*    (2006.01)

(52) U.S. Cl. .................... 156/293; 156/309.9; 55/497; 210/493.5

(58) Field of Classification Search ............. 156/207, 156/293, 303.1, 309.6, 309.9; 55/497, 500, 55/511, DIG. 31; 210/483, 493.1, 493.3, 210/493.5
See application file for complete search history.

(56) References Cited

U.S. PATENT DOCUMENTS

| | | | |
|---|---|---|---|
| 1,890,499 A * | 12/1932 | Davies | ............... 55/497 |
| 3,938,973 A | 2/1976 | Kershaw | |
| 5,531,235 A | 7/1996 | Hassenhoehler, Jr. | |
| 5,652,041 A | 7/1997 | Buerger et al. | |
| 5,709,735 A | 1/1998 | Midkiff et al. | |
| 5,820,645 A | 10/1998 | Murphy, Jr. | |
| 6,033,454 A | 3/2000 | Hoeffkin | |
| 6,159,318 A | 12/2000 | Choi | |
| 6,254,653 B1 | 7/2001 | Choi et al. | |
| 6,387,141 B1 | 5/2002 | Hollingsworth et al. | |

* cited by examiner

*Primary Examiner*—Jeff H. Aftergut
*Assistant Examiner*—John L. Goff
(74) *Attorney, Agent, or Firm*—Steve A. Witters; Middleton Reutlinger

(57) ABSTRACT

Self-supporting pleated fluid filter medium and method of making the same wherein the filter medium and accompanying flow-through border frame are of coated thermobondable materials, which are heat bonded together.

14 Claims, 4 Drawing Sheets

THERMOBONDABLE FILTER MEDIUM AND BORDER FRAME AND METHOD OF MAKING SAME

CROSS-REFERENCE TO RELATED APPLICATIONS

This application is a division of application Ser. No. 10/119,997 filed Apr. 10, 2002, now U.S. Pat. No. 6,758,878 and which is incorporated herein by reference.

BACKGROUND OF THE INVENTION

The present invention relates to a flow-through filter medium product and more particularly to a unique and novel unified filter medium, border frame therefore and method of assembling the novel filter medium to the border frame to assure a sturdy and stable unit filter arrangement for efficient treatment of a high velocity fluid stream.

It has been long known to utilize thermoplastic, melt blown materials for filtration purposes, attention being directed to U.S. Pat. No. 5,531,235, issued to C. B. Hassenboehler, Jr. et al on Jul. 2, 1996, which utilizes such an arrangement in the manufacturing of cigarette filters. Attention is further directed to the heat bonding arrangements disclosed in U.S. Pat. No. 5,652,041, issued to G. K. Buerger et al on Jul. 29, 1997; U.S. Pat. No. 5,709,735, issued to D. G. Midkiff et al on Jan. 20, 1998; U.S. Pat. No. 6,159,318, issued to Kyung-Ju Choi on Dec. 12, 2000; and, to U.S. Pat. No. 6,254,653, issued to Kyung-Ju Choi et al on Jul. 3, 2001. In addition to the heat bondable filter medium set forth in each of these aforementioned patents, attention also is directed to the border frame support units and manufacturing processes disclosed in certain of these aforementioned patents.

Recognizing the broad features of the prior art as taught by the prior art, the present invention provides an efficient, economical, and, straight forward structure for a unique filter medium with compressed edges which enhances both binding assembly and subsequent filtration efficiency. The present invention further provides a unique and compatible unified border frame member to cooperatively receive and support such novel filter medium of the present invention and which also enhances filter unit assembly sealing operations. In addition, the present invention provides a unique and novel unified assembly arrangement requiring a minimum of efficient and economical steps to sealingly join the novel filter medium and novel border frame member to produce an efficient, sturdy and stable filter unit, capable of ready installation for the filter treatment of high velocity fluid streams.

Various other features of the structural arrangement of the novel edge treated filter medium, novel support border frame therefore and the novel method, all as disclosed in a unified manner herein, will become obvious to one skilled in the art upon reading the disclosure set forth herein.

BRIEF SUMMARY OF THE PRESENT INVENTION

More particularly the present invention provides a unique fibrous filter medium which lends itself to ready assembly with the novel border frame arrangement also further described herein and to the unified novel assembly method also described hereinafter.

Specifically, the present invention provides a novel self-supporting pleated fluid filter medium including opposed upstream and downstream faces comprising at least one sheet of thermoplastic synthetic fibrous material which can be of low melt attenuated fibers with selected denier characteristics or a dri-laid blend of chopped fibers of selected size and diameter. The fibrous material should have at least a sufficient stiffness to provide for self-supporting pleats sufficient to maintain pleat form during an anticipated fluid filtering treatment velocity. Advantageously, the inventive sheet of thermoplastic fibrous material can be up to 100% by weight of preselected thermoplastic fibers comprising dri-laid blended chopped fibers comprising 0.5 to 40 denier fibers, with fiber lengths of 0.3 to 3 inches, or, if of melt blown material with fiber sizes in the range of approximately 0.3 to 35 micrometers.

In addition, the present invention provides a novel border frame member comprised of at least one strip of material, the strip being conformably sized to engage opposed peripheral edge faces of thermoplastic fluid filter medium to be bonded thereto.

Further, the present invention also provides a novel method of assembling the selectively sized and configured pleated unit filter medium and the border frame which incorporates thermobondable coated materials comprising: heat softening selected edges of at least one thermobondable unit filter medium layer; compressing selected edges of the unit filter medium into substantially rigid border edges; mounting the unit filter medium unto a compatibly sized and configured thermobondable border frame having selected filter medium support edges to receive and support the border edges of the unit filter medium in facing relationship therewith; and thermobonding the facing edges of the unit filter medium and the border frame in sealed relation.

It is to be understood that various changes can be made by one skilled in the art in one or more of the several features and parts of the novel filter medium and the novel flow-through border frame, as well as in one or more of the several steps of the inventive method described herein without departing from the scope or spirit of the present invention.

BRIEF DESCRIPTION OF THE DRAWINGS

Referring to the drawings, which disclose advantageous embodiments of the unified inventive unit filter medium, the novel supporting flow-through border frame therefore; and, a schematic diagram of the novel method of sealingly assembling the unique unit filter medium and compatible supporting border frame.

DETAILED DESCRIPTION OF THE DRAWINGS

Figure 1:
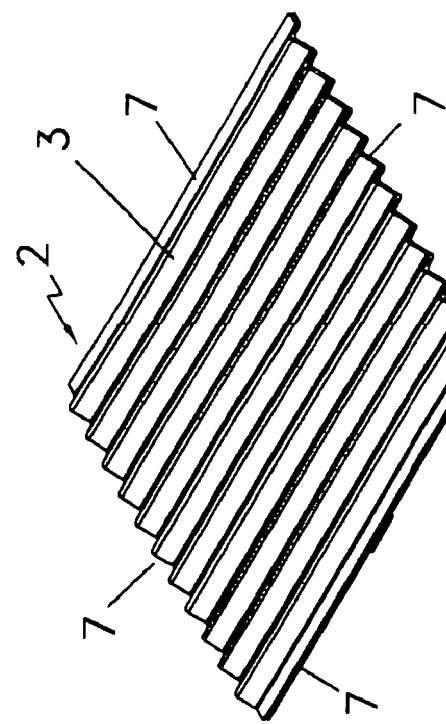
FIG. 1 is an isometric view of the novel pleated fibrous filter medium of rectangular configuration, disclosing one of two pairs of opposed flattened edges.

Referring to FIG. 1 of the drawings, the inventive unit filter medium is disclosed in pleated form, which filter medium can be pleated in any one of several ways known in the art and advantageously can be pleated in a manner such as set forth in aforementioned U.S. Pat. No. 6,254,653, issued to Kyung-Ju Choi et al on Jul. 3, 2001.

In accordance with one feature of the present invention, the novel filter medium 2 (FIGS. 1–3) includes opposed upstream and downstream faces 3 and 4 and in one advantageous embodiment of the present invention can be of at least one sheet of thermoplastic, fibrous material of dri-laid blended chopped fibers or melt-blown fibers having at least a sufficient stiffness to provide for self-supporting pleats to maintain pleat form during an anticipated fluid filtering treatment velocity in the range generally of approximately 3 to 4000 cubic feet per minute (cfm) with a cross-sectional thickness between upstream and downstream faces in the range of approximately 0.05 to 1 inch.

It is to be understood that the aforementioned dimensional ranges can be varied accordingly with the understanding of the nature of the fluid stream to be treated. Advantageously, with thermoplastic fibers being used as a material, the fibers can be of up to 100% by weight of preselected fibers such as polyolefin, polyester, or nylon. If the fibers are of dri-laid blended chopped fibers, they are comprised approximately in the range of 0.5 to 40 denier fibers, and preferably of approximately 3 denier fibers. If melt-blown web is used, the fibers can be of diameters in the range of approximately 0.3 to 35 micrometers.

The selected fibrous material, advantageously can have a Gurley stiffness in the range of approximately 400 to 2000 milligrams (mg) and advantageously a Gurley stiffness of approximately 600 milligrams. Further, the selected fibrous material can have a Frazier permeability in the range of approximately 3 to 4000 cubic feet per minute, per square foot (cfm/ft$^2$) and advantageously approximately 550 cubic feet per minute, per square foot (cfm/ft$^2$).

In accordance with another feature of the present invention, the aforedescribed selected fibrous filter medium, which can be of one or several layers in thickness, can include a facing of thermoplastic netting of polyolefins or non-woven scrim material 6 (FIG. 1) at least on the downstream face 4 thereof in order to assure a self-supporting inventive filter medium arrangement. A synthetic binding stiffener such as polyvinyl acetate (pva) or ethylene vinyl acetate (eva) or acrylic in the approximate range by weight of 15% to 60% and advantageously approximately 35% by weight of the overall weight can be applied to the dri-laid fibrous material. Each unit filter medium can be configured to be of rectangular shape but the present invention is not to be considered as limited to such rectangular configuration since other configurations can be utilized such as but not limited to, circular, oval or elliptical shape, depending upon the prospective nature of installation in a fluid stream to be treated.

Figure 3:
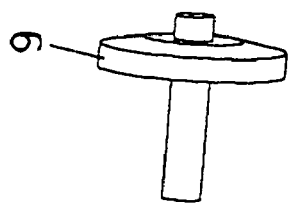
FIG. 3 is a schematic, side view of a roller anvil member, which can be utilized in place of the lineal anvil members of FIG. 2.
Figure 4:
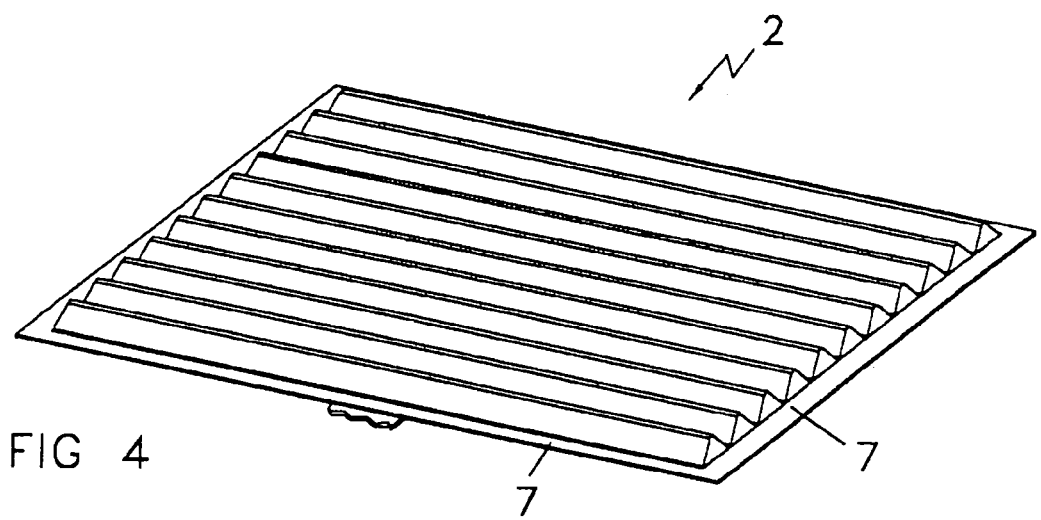
FIG. 4 is another isometric view of the rectangularly configured pleated filter medium of FIGS. 1 and 2 with opposed pairs of side edges in compressed, flattened form, this view being positioned in aligned relation above the unique compatible rectangularly configured flow-through border frame disclosed in isometric form in FIG. 5.
Figure 5:
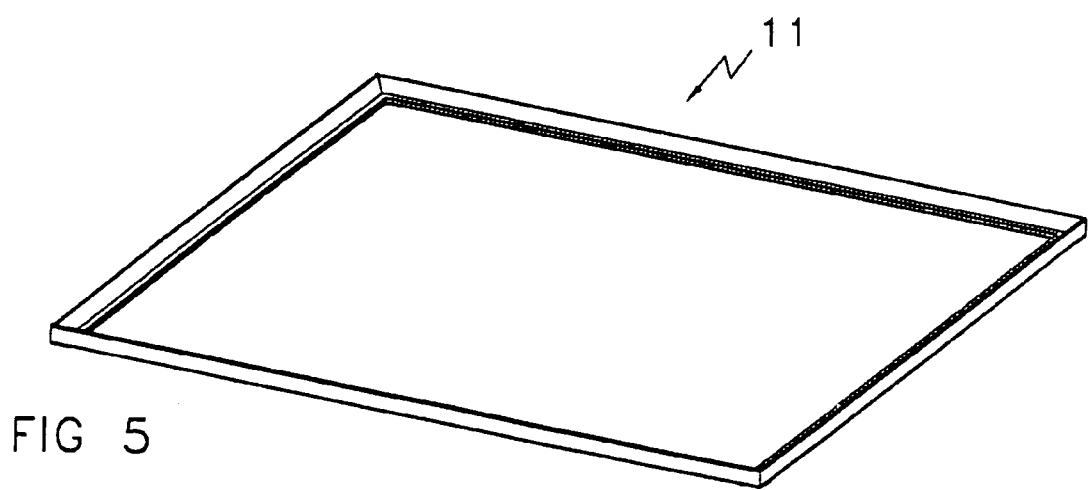
FIG. 5 is an isometric view of the unique compatible rectangularly configured flow-through border frame, disclosing two pairs of opposed, flattened edges positioned to matingly receive and facingly engage in sandwich relation with the pairs of opposed flattened edges of the rectangularly configured unit filter medium of FIG. 4.

Referring to FIGS. 1–4 of the drawings it can be seen that at least a portion of the edges 7 of each unit filter medium 2 can be flat or compressed to be flat in a manner described hereinafter by appropriately positioned, opposed lineal presses or platens 8 (FIG. 2) or by suitably appropriately positioned opposed roller presses 9 (FIG. 3). An appropriate backing (not shown) cooperates with platens 8. It is to be noted that opposed blowers 23 serve to provide heated air to edges 7 prior to compression. As best seen in FIGS. 4 and 5, the border or edges 7 have a depth/width less than the depth/width of the pleats.

Figure 2:
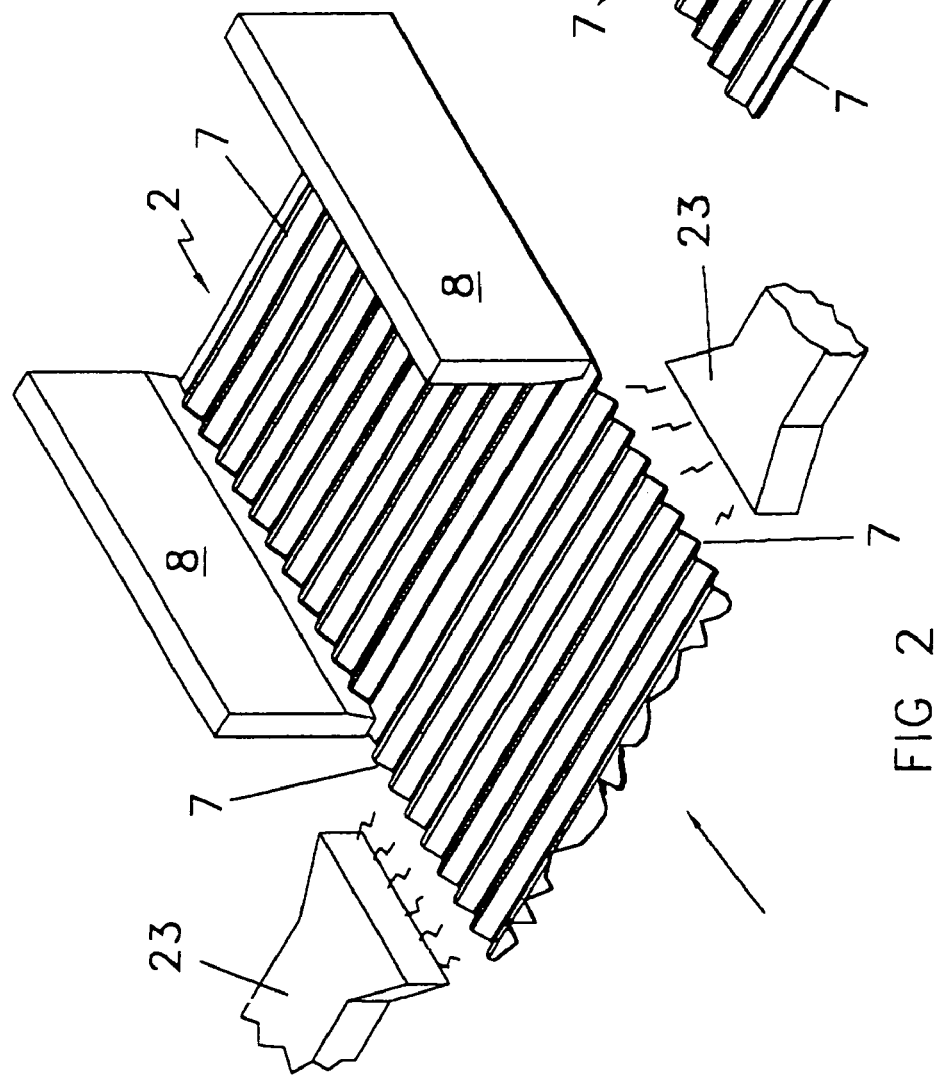
FIG. 2 is a schematic, isometric view of the novel rectangularly configured, pleated filter medium of FIG. 1 superposed by a pair of opposed lineal anvil members positioned to assure compression in flattened form of the other of the two pairs of filter medium flattened edges.

In FIG. 2, opposed pairs of edges 7 of rectangularly configured filter medium 2 are shown being formed to be in compressed state. It is to be understood that portions or the entirety of the peripheral edges of other configured shapes such as, but not limited to, oval, elliptical or circular (not shown) can also be similarly compressed.

Referring to FIGS. 4–7 of the drawings, the unique and novel unit border frame 11, which serves to receive the filter medium 2 with compressed peripheral edges 7 can be seen. As can be particularly seen in FIGS. 5 and 6 of the drawings, the novel border frame 11 is here shown as being of rectangular configuration and as being sized and constructed to be conformable in faced relation with the peripheral edges 7 of rectangularly shaped filter medium 2. Advantageously, border frame 11 can be formed from a sturdy, foldable cardboard, chipboard or suitable synthetic plastic material, which can be thermobondable or have parts thereof coated with a plastic film.

Figure 6:
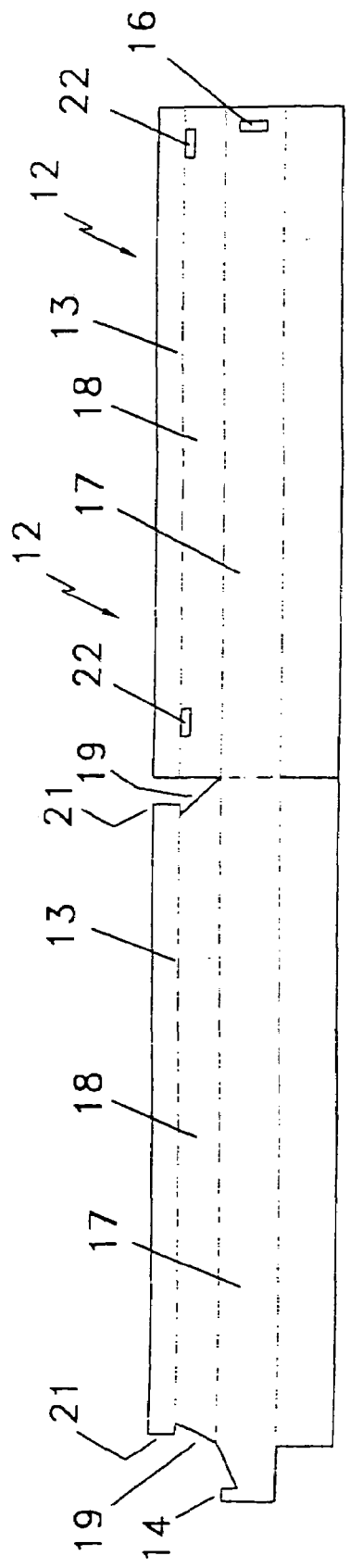
FIG. 6 discloses in non-erected form a flattened strip of one of two such similar strips, which can be folded and erected to be subsequently joined to each other in set-up form to provide the rectangularly configured border frame isometrically disclosed in FIG. 5.

In the embodiment disclosed the novel, rectangular border frame 11 can be formed from two similar flat strips 12 of material (only one of which shown in FIG. 6). Each strip 12 can be synthetically coated on the surface 13, which engages with the compressed edges 7 of unit filter medium 2 (FIG. 6). Each strip 12 provides two sides of rectangular border frame 11 and each strip includes a hook-shaped interlocking tab 14 at one extremity thereof and an appropriately sized slot 16 at the opposite extremity thereof in order to allow the two similar flat strips 12 to interlockingly engaged through tabs 14 and slots 16 when the two sides of each strip 12 are folded normal to each other to thus form, rectangular interlocked border frame unit 11. It is to be understood that it also would be possible to form the four sides of border frame 11 from a single lat strip of material and (not shown) which can be appropriately foldable.

Figure 7A:
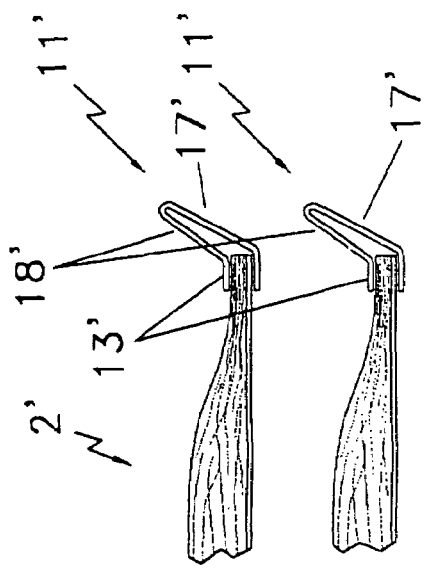
FIG. 7A is a view similar to FIG. 7 of a modified border frame member and filter medium arrangement illustrated to accommodate stacking for storage and shipment; and, FIG. 8 is a schematic side view disclosing in a schematic flow diagram one form of structural assembly arrangement which can be employed to accomplish the several steps of the novel invention as described hereinafter.
Figure 7:
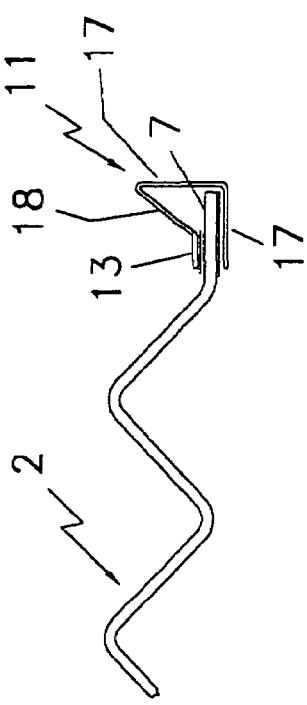
FIG. 7 is an enlarged, broken away, cross-sectional side view of a portion of the unit filter medium of FIG. 4 and the erected unit border frame member of FIGS. 5 and 6 to be in joined and bonded relation, as described hereinafter.

It is to be noted in FIG. 6 that each strip 12 can be provided with appropriate lineal extending score lines to allow folding of the strip into two of the joined four sides of border frame 11 with adjoined longitudinally extending panels 17 and 18 forming the border frame sides to include a longitudinally extending raised geometrically shaped, triangular, cross-sectional portion spaced from the compressed edge 7 of at least one of the opposed filter faces of filter medium 2 (FIG. 7). As can be particularly seen in FIG. 7, when border frame 11 is erected, longitudinally extending panels 18 are positioned at an angle to the adjoining longitudinally extending panels 17, which serve to form the sides of border frame 11. It again is to be noted hat aforementioned coated surface engaging strip 13 serves to engage the compressed edges 7 of filter medium with the flat distal end portion engaging the filter medium face. In this regard, one longitudinally extending panel 17 adjoining the other side forming longitudinally extending panel is folded at right angles thereto to cooperate with strip 13 so as to engage the opposed faces of edges 7 of filter medium 2 therebetween. It further is to be noted that one panel 18 and adjoining edge engaging strip 13 of the two-sided strip 12 is formed at opposed extremities with cut-aways 19 in panel 18 and tabs 21 in strip 13. The other foldable adjoining panel 18 is provided with slots 22 to receive tabs 21 in locked position therewith. Thus, when the two similar strips 12 are appropriately set-up to form rectangular border frame 11 to receive conforming rectangular filter medium unit 2, the bondable coated surfaces are then in position to be ultrasonically bonded together.

Referring to FIG. 7A, it is to be noted that a modified embodiment of the present invention can be made to the described embodiment of the invention as set forth, particularly in FIGS. 6 and 7, wherein element 18' is arranged to slope or flare outwardly from the main body of frame 11' to accommodate stacking of filters for storage and shipping purposes in a manner similar to that disclosed in U.S. Pat. No. 6,033,454, issued to B. W. Hoeffken on Mar. 7, 2000.

Figure 8:
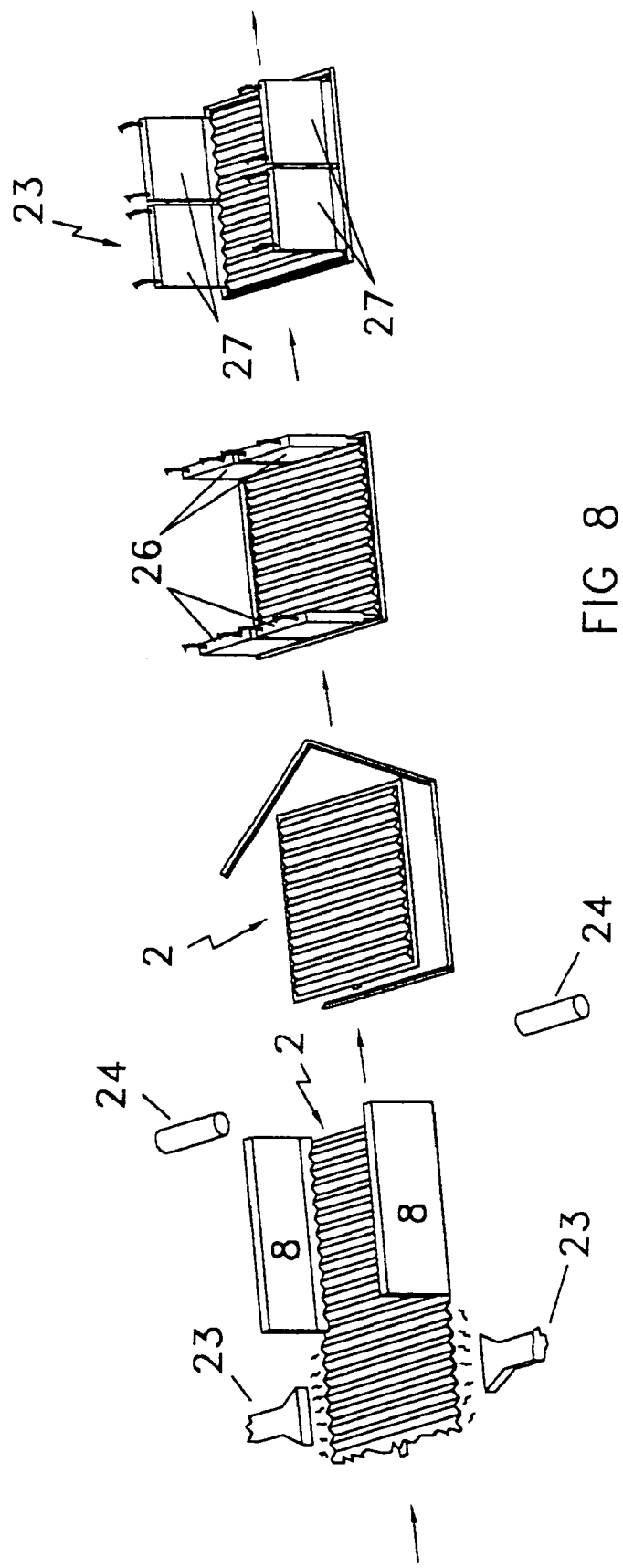

Referring to FIG. 8 which discloses in schematic flow diagram form the several steps of one novel, inventive method embodiment of a unit filter assembly of the present invention, a selectively sized and appropriately configured pleated filter medium 2 of a selected thermobondable material as above described is fed from a filter medium pleating line not shown or described herein but as above noted can be pleat formed by any one of several known methods for forming such pleated filter medium 2. In the flow diagram disclosed herein, a rectangular unit filter assembly is shown, but as above stated, it is to be understood that the present invention, including the inventive method herein described, is not limited to the rectangular unit filter assembly configuration as shown but that other geometrically shaped unit filter arrangements also can be produced by the unique and inventive method steps herein described.

In the first stage of the present invention, as thermobondable filter medium 2 which can incorporate at least one layer of up to 100% by weight thermoplastic fibers of dri-laid blended chopped fiber of approximately 0.5 to 40 deniers, or melt-blown fibers with diameters in the range of 0.3 to 35 micrometers, if of blended chopped fibers of approximately 0.3 to 3 inch lengths and which can include a thermoplastic flow-through facing and a synthetic binding stiffener, if the material so requires, is continuously fed past a pair of oppositely spaced blowers 23 which are arranged to blow a heated fluid such an air along the opposed edges 7 of filter medium 2 to soften such opposed edges. The temperature of the heated fluid, such as air, steam or conductive or radiant heating means can advantageously be in the temperature range of 150° F. to 525° F. It is to be understood that such temperature range of the heated fluid can vary depending on the nature of he fluid and the nature of the thermobondable filter medium being edge treated.

The filter medium 2 with opposed, heat softened edges 7 then passes between a first pair of spaced opposed compressing press or platen bars 8, as shown in FIGS. 2 and 8 of the drawings. These spaced opposed edges compressing platen bars 8 are arranged to be aligned with the opposed edges of the filter medium 2 and can be moved vertically in an "up-down" manner to compress the opposed edges to a selected substantially rigid form.

The edge compressed filter medium 2 is then cut or severed in any one of several manners, such as by spaced opposed appropriate cutters 24, and mounted as a unit filter medium 2 (FIGS. 3 and 4) into a novel thermobondable border frame 11 as above described and shown in FIGS. 4–6 and particularly as shown in enlarged FIG. 7 with flat or compressed edges 7 sandwiched between coated surface folded panels 13 of panel 18 and the lower foldable portions of panels 17.

Once the unit filter medium 2 is appropriately and conformably mounted along edges 7 in assembled border frame 11, the assembled unit filter then is passed to spaced, opposed pairs of ultrasonic sealing sets 26 and 27 which sealing sets are positioned normally to each other and which also can be vertically "up-down" moveable to ultrasonically seal the sandwiched filter medium edges to the overlapping border panels. It is again to be noted in FIG. 8, that the spaced ultrasonic sets 26 and 27, each of which includes two pairs of opposed ultrasonic members are positioned respectively normal to and in alignment with the line of flow of the unit filter assemblies thus providing for the sealing of all four flattened edges 7 of thermobondable unit filter medium 2 to the sandwiching panels of thermobondable border frame 11.

As above-described, the flow-through border frame 11 can be of thermobondable chipboard. Further, the ultrasonic welding by welding sets 26 and 27 can be accomplished at a frequency of approximately 20 kilohertz (khz) with the welding being accomplished with gaps between assembled unit filters in the range of approximately 0.05 to 0.3 inches

The invention claimed is:

1. A method of assembling a selectively sized and configured pleated unit filter medium and a border frame which incorporates thermobondable materials comprising:
   heat softening selected opposed edges of at least one thermobondable pleated unit filter medium layer;
   compressing said opposed selected edges of said pleated unit filter medium into substantially flat border edges;
   mounting said unit filter medium onto a compatibly sized and configured thermobondable flow-through border frame having selected filter medium support edges to receive and support said compressed border edges of said unit filter medium in facing relationship therewith; and
   thermobonding said facing edges of said unit filter medium with said border frame.

2. The method of assembling the unit filter and border frame of claim 1 wherein said step of compressing comprises compressing said edges of said pleated unit filter medium to form said border edges of said pleated unit filter medium such that said border edges have a depth/width coordinated with the depth/width of the pleats of said pleated unit filter medium.

3. The method of claim 2 wherein said border edges have a depth/width less than depth/width of the pleats of said pleated unit filter medium.

4. The method of assembling the unit filter and border frame of claim 1, wherein said heat softening of opposed select edges of said filter medium is accomplished by a heating source within a selected temperature range.

5. The method of assembling the unit filter and border frame of claim 4, wherein said temperature range is approximately 150° F. to 525° F.

6. The method of assembling the unit filter and border frame of claim 1, wherein said thermobonding is accomplished by ultrasonic welding.

7. The method of assembling the unit filter and border frame of claim 6, wherein said ultrasonic welding is at a frequency of approximately 20 kilohertz (khz).

8. The method of assembling the unit filter and border frame of claim 1, wherein said thermobonding comprises a preselected pattern of varied spacing.

9. The method of assembling the unit filter and border frame of claim 8, wherein said thermobonding spacing is in gaps in the range of approximately 0.05 to 0.3 inches.

10. The method of assembling the unit filter and border frame of claim 1, wherein said border frame is of selectively layered chipboard.

11. The method of assembling the unit filter and border frame of claim 1, wherein 1 unit filter medium layer includes a thermoplastic flow-through facing and synthetic stiffener.

12. The method of assembling the unit filter and border frames of claim 1, wherein said filter medium layer and border frame are of rectangular shape, said compressing of filter edges and said thermobonding of facing edges of said filter medium and said border frame being accomplished in at least two steps on a moving assembly line by pairs of spaced opposed edge compressing and thermobonding tools, one pair of which is in-line with the axis of movement of said facing edges and the other pair of which is normal to said axis of movement.

13. A method of assembling a selectively sized and rectangularly configured pleated unit filter and a compatibly configured border frame which filter medium incorporates at least one layer of up to 100% by weight melt blown fibers of approximately 0.3 to 35 micrometers and which includes a thermoplastic flow-through facing and a synthetic stiffener; the method comprising:

heat softening the pairs of opposed edges of said rectangular filter medium with suitable heating in the temperature range of 150° F. to 525° F.;

compressing said opposed heated edges to a substantially flattened form to have a depth/width calculably coordinated with the depth/width of the pleats of the pleated unit filter;

cutting said layered unit filter medium into a rectangular shape;

mounting said rectangular unit filter medium onto a compatibly rectangularly sized selectively layered thermobondable chipboard flow-through border frame unit having inwardly extending edges to receive and support said flattened border edges of said layered unit filter medium in facing relationship therewith;

ultrasonically welding said facing edges at a frequency of approximately 20 kilohertz (khz), said ultrasonic welding being accomplished on a moving assembly line with thermobonding varied spacing gaps in the range of approximately 0.05 to 0.3 inches, said compressing of said layered filter medium edges and said thermobonding of said facing edges being accomplished in at least two steps by respective pairs of spaced opposed edge compressing and ultrasonic thermobonding tools one pair of said ultrasonic tools being in line with the axis of movement of said facing edges and the other pair of aid ultrasonic tools being normal to said axis of movement.

14. The method of claim 13 wherein said step of compressing said opposed selected edges includes compressing said edges such that said edges have a depth/width less then the depth/width of the pleats of the pleated filter medium.

* * * * *